(12) United States Patent
Nakhei-Nejad

(10) Patent No.: US 9,282,763 B2
(45) Date of Patent: Mar. 15, 2016

(54) APPARATUS FOR REMOVING HULLS FROM NUTS

(71) Applicant: Mohammad Nakhei-Nejad, Edmonton (CA)

(72) Inventor: Mohammad Nakhei-Nejad, Edmonton (CA)

(*) Notice: Subject to any disclaimer, the term of this patent is extended or adjusted under 35 U.S.C. 154(b) by 108 days.

(21) Appl. No.: 14/175,588

(22) Filed: Feb. 7, 2014

(65) Prior Publication Data

US 2015/0223514 A1  Aug. 13, 2015

(51) Int. Cl.
*A23N 5/00* (2006.01)
*A23N 5/08* (2006.01)
*B07B 13/05* (2006.01)
*B02B 3/04* (2006.01)

(52) U.S. Cl.
CPC .. *A23N 5/08* (2013.01); *A23N 5/00* (2013.01); *B02B 3/045* (2013.01); *B07B 13/05* (2013.01)

(58) Field of Classification Search
CPC ............ A23N 5/00; A23N 5/08; B02B 3/045; B07B 13/05
See application file for complete search history.

(56) References Cited

U.S. PATENT DOCUMENTS

| | | | |
|---|---|---|---|
| 822,105 A | 5/1906 | Eklund | |
| 867,276 A | 10/1907 | Jenkins | |
| 1,318,003 A | 10/1919 | Wheeler et al. | |
| 1,757,762 A * | 5/1930 | Williams | 19/37 |
| 1,823,135 A * | 9/1931 | Elliott | 19/56 |
| 1,827,736 A * | 10/1931 | Coari | 209/44.3 |
| 1,880,934 A * | 10/1932 | Elliott | 19/37 |
| 1,946,783 A * | 2/1934 | Deems | 19/37 |
| 1,950,061 A * | 3/1934 | Ott | 19/38 |
| 1,963,260 A * | 6/1934 | Conrad | 19/37 |
| 1,976,382 A * | 10/1934 | Blewett | 19/37 |
| 1,981,575 A * | 11/1934 | Wallace | 19/97 |
| 2,011,838 A * | 8/1935 | Wilson | 19/56 |
| 2,087,390 A * | 7/1937 | Streun | 19/37 |
| 2,100,301 A * | 11/1937 | Mitchell | 19/35 |
| 2,161,032 A * | 6/1939 | Formway | 99/591 |
| 2,189,690 A * | 2/1940 | Tigner | 19/55 R |
| 2,208,239 A * | 7/1940 | Andersen | 99/626 |
| 2,428,852 A | 10/1947 | Muir et al. | |
| 2,668,989 A * | 2/1954 | Vandergriff | 19/36 |
| 3,162,903 A * | 12/1964 | Wallace | 19/59 |
| 3,266,101 A * | 8/1966 | Brooks et al. | 19/57 |
| 4,034,665 A | 7/1977 | McFarland et al. | |
| 4,353,931 A | 10/1982 | Volk, Sr. | |
| 4,448,115 A | 5/1984 | Volk, Sr. | |
| RE31,979 E | 9/1985 | Volk, Sr. | |
| 4,874,097 A | 10/1989 | Argiriadis | |
| 5,245,918 A | 9/1993 | Volk, Sr. | |
| 5,329,845 A | 7/1994 | Bichel | |
| 5,720,395 A | 2/1998 | Schock et al. | |

(Continued)

FOREIGN PATENT DOCUMENTS

GB         0001504      *  1/1914

*Primary Examiner* — Anthony Weier
(74) *Attorney, Agent, or Firm* — Bennett Jones LLP

(57) ABSTRACT

An apparatus for removing hulls from nuts includes a rotating drum with protrusions on its surface, a hulling plate and a separator plate. Rotation of the drum causes nuts deposited on an upper surface of the drum surface between the hulling plate and the separator plate to be impinged by the protrusions against the hulling plate, thereby removing the hulls and pushing the hulls through a hulling gap between the hulling plate and the upper surface of the drum, while the hulled nuts pass through a separator gap between the separator plate and the upper surface of the drum, thereby separating the hulled nuts.

17 Claims, 9 Drawing Sheets

(56) References Cited

U.S. PATENT DOCUMENTS

| | | | |
|---|---|---|---|
| 5,879,734 A | 3/1999 | Broyles | |
| 6,108,872 A * | 8/2000 | Nichols et al. | 19/62 R |
| 6,382,427 B1 | 5/2002 | Nakhei-Nejad | |
| 6,422,137 B1 * | 7/2002 | Nakhei-Nejad | 99/621 |
| 7,357,952 B2 | 4/2008 | Foroutanaliabad et al. | |
| 7,695,750 B2 | 4/2010 | Foroutanaliabad et al. | |
| 7,717,033 B1 * | 5/2010 | Kim | 99/574 |
| 8,056,728 B2 | 11/2011 | Riise et al. | |
| 8,273,396 B1 * | 9/2012 | Shepard et al. | 426/478 |

* cited by examiner

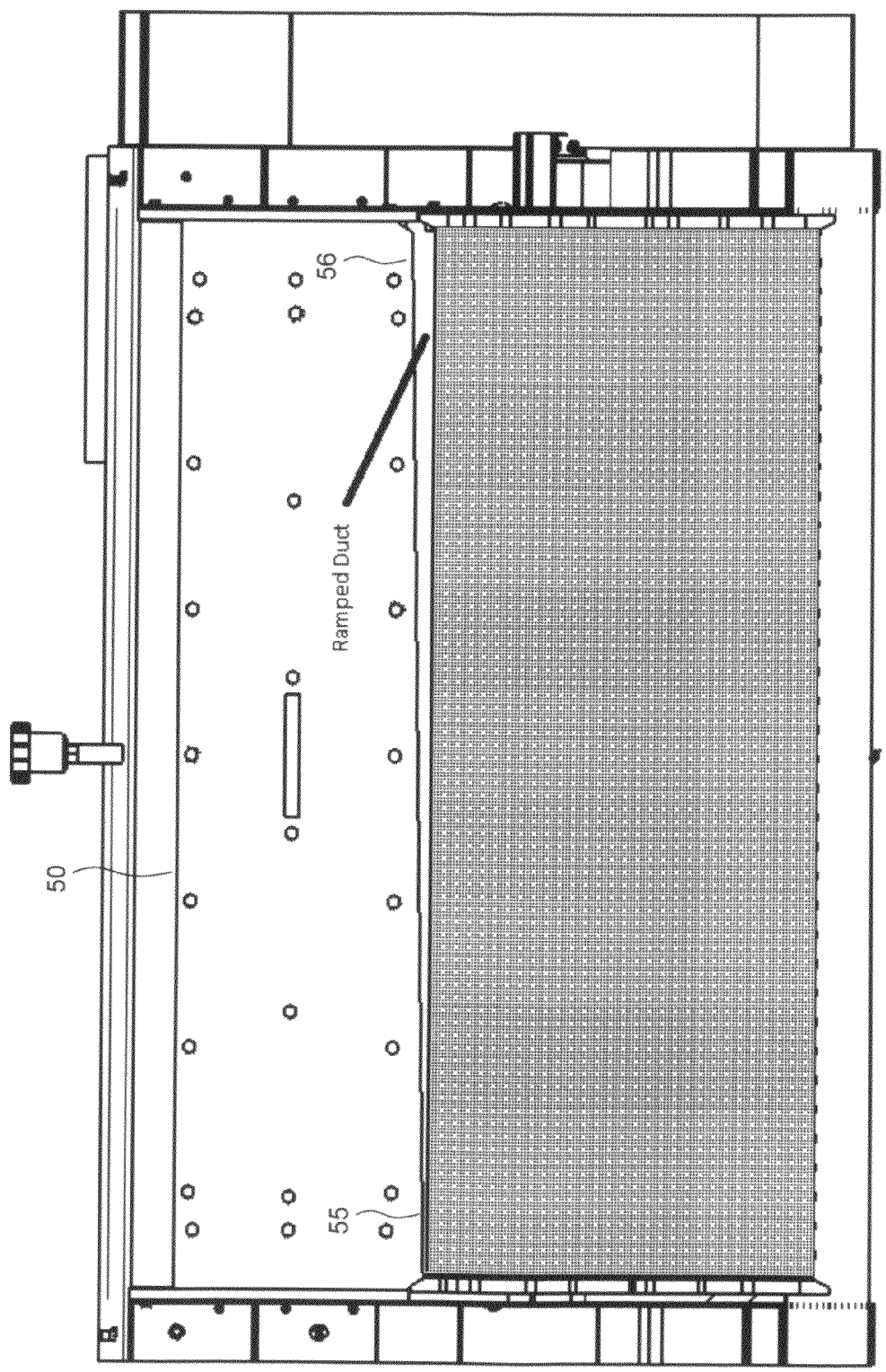

APPARATUS FOR REMOVING HULLS FROM NUTS

FIELD OF THE INVENTION

The present invention relates to an apparatus and method for removing hulls from nuts.

BACKGROUND OF THE INVENTION

Pistachio nuts comprise a greenish edible seed, enclosed within a hard, straw-colored shell (endocarp), enclosed in turn within a fleshy, green, outer hull (pericarp). Pistachio nuts are typically sold as a food product to end consumers within shells, but without hulls. The hulls of pistachio nuts are stronger and more tenaciously adherent to the shells, and thus more difficult to remove than the hulls of many nuts, particularly if the pistachio is not yet ripe. Further, the hulls are preferably removed from the shell promptly after harvest or else the straw color of the shell will become unattractively blemished. Accordingly, removing the hulls of pistachios in a timely manner and in commercial scale quantities requires either abundant manual labour or mechanized methods. A variety of machines for removing the hulls of pistachio nuts have been developed in the prior art.

U.S. Pat. No. 4,034,665 to McFarland et al. describes a two-stage pistachio huller comprising a pair of rollers and a plurality of fine rollers. In the first stage of operation, the pistachio nuts are passed through the pair of rollers to rupture their pericarps and form tag ends of pericarps adherent to their shells. In the second stage of operation, the pistachio nuts are advanced along the longitudinal direction of a plurality of fine rollers that alternately and oppositely oscillate to strip the tag ends of pericarps from the pistachio nuts. During the second stage, nozzles supply pressurized water to moisten and soften the pericarp of the pistachio nuts, rinse the pericarp from the shells of the pistachios, and urge the pericarp fragments and hulled pistachios along the longitudinal direction of the fine rollers. Finally, the pericarps and the hulled pistachios are separated by screening. This pistachio huller suffers from the disadvantage that it may require substantial amounts of water to operate and undesirably moistens the pistachio nuts.

U.S. Pat. No. 4,448,115 to Volk, Sr. describes a pistachio huller comprising a drum with projections on its outer surface, and a semi-flexible, serrated surface having yieldable slots narrower than the pistachio nuts. In operation, pistachio nuts are deposited on the surface so that they rest partially within the slots. The drum is rotated so that the projections urge the pistachio nuts into compressive contact with the serrated surface and the projections, thereby abrading and hulling the pistachio nuts. The pericarps and the hulled pistachios are subsequently separated by blown air. This pistachio huller suffers from numerous potential disadvantages including that the semi-flexible material is prone to wear, and must therefore be monitored and maintained for proper performance.

U.S. Pat. No. 5,245,918 to Volk, Sr. describes a similar pistachio huller comprising a drum with projections on its outer surface, and a rigid concave surface having slots wider than the pistachio nuts to be hulled. In operation, pistachio nuts are deposited on the concave surface so that they fall within the channels. The drum is rotated so that the projections push the pistachio nuts along the channel, thereby abrading and hulling the pistachio nuts. The pericarps and the hulled pistachios are subsequently separated by blown air. This pistachio huller suffers from numerous potential disadvantages including that residues of the pericarp may accumulate within the channels of the pistachio huller, and thereby interfere with its proper operation.

Accordingly, there is a need in the art for an apparatus and method for removing the hulls of pistachio nuts that overcomes the disadvantages of the prior art. The apparatus preferably operates without water assistance, separates the removed hulls from the hulled pistachios without the need for additional mechanisms, and is simple and economical to construct, operate, and maintain.

SUMMARY OF THE INVENTION

In one aspect, the present invention relates to an apparatus for removing hulls from nuts. The apparatus comprises a support frame, a substantially cylindrical drum, a means for rotating the drum, a hulling plate having a hulling edge, and a separator plate having a separator edge. The drum has a substantially horizontal central axis and a circumferential drum surface with a plurality of spaced apart protrusions. The drum is rotatably mounted to the support frame for rotating about the central axis. The hulling edge and the separator edge are transverse to the drum surface. The hulling edge and an upper surface of the drum define therebetween a hulling gap that is sized to permit passage of the protrusions and the hulls, but not nuts. The separator edge and the upper surface of the drum define therebetween a separator gap that is sized to permit passage of the protrusions and at least a portion of the separator gap is sized to permit passage of hulled nuts. The upper surface of the drum, the hulling plate and the separator plate define a hulling chamber where the drum surface rotates towards the hulling plate and away from the separator plate.

In one embodiment of the apparatus, the plurality of protrusions are spaced apart to prevent passage of nuts along the drum surface between the protrusions but permit passage along the drum surface of hulled nuts between the protrusions.

In one embodiment of the apparatus, at least one of the plurality of protrusions comprises a knife edge oriented towards the hulling plate as the drum surface in the hulling chamber rotates toward the hulling plate and away from the separator plate.

In one embodiment of the apparatus, at least one of the plurality of protrusions has a quadrilateral cross-section parallel to the drum surface. The quadrilateral cross-section may have a leading face that is angled relative to the central axis of the drum.

In one embodiment, the plurality of protrusions is spaced apart on the drum surface in a pattern defining a helical path running circumferentially around the central axis of the drum.

In one embodiment of the apparatus, the drum comprises a core and at least one surface segment removably attachable to the core to define at least a portion of the drum surface. The at least one surface segment may be removably attachable to the core via a complementary tongue and groove connection formed on the surface segment and the core, respectively, or vice versa. The at least one surface segment may define a portion of the drum surface having at least one of the plurality of protrusions.

In one embodiment of the apparatus, the hulling edge is disposed above the separator edge. The hulling edge and the separator edge may be disposed on the same horizontal side of the central axis of the drum.

In one embodiment of the apparatus, the hulling edge is a knife edge.

In one embodiment of the apparatus, the entire separator gap is sized to permit passage of hulled nuts. In another embodiment of the apparatus, only a portion of the separator gap is sized to permit passage of hulled nuts. That portion of the separator gap may be defined by a region of the separator edge including an end of the separator edge.

In one embodiment of the apparatus, the hulling plate is adjustably mounted to the support frame for adjusting the size of the hulling gap. In one embodiment of the apparatus, the separator plate is adjustably mounted to the support frame for adjusting the size of the separator gap.

In another aspect, the invention provides a method for removing hulls from nuts, the method comprising the steps of:
  (a) providing a substantially cylindrical drum rotatable about a substantially horizontal axis and having a circumferential drum surface with a plurality of spaced apart protrusions;
  (b) providing a hulling plate having a hulling edge transverse to the drum surface, wherein the hulling edge and an upper surface of the drum define therebetween a hulling gap that is sized to permit passage of the protrusions and the hulls but not nuts;
  (c) providing a separator plate having a separator edge transverse to the drum surface, wherein the separator edge and the upper surface of the drum define therebetween a separator gap that is sized to permit passage of the protrusions and hulled nuts;
  (d) depositing nuts on the upper surface of the drum between the hulling plate and the separator plate;
  (e) rotating the drum to move the upper surface of the drum between the hulling plate and the separator plate towards the hulling plate and away from the separator plate, so that the drum surface and/or the protrusions impinge the nuts against the hulling edge to remove hulls from the nuts; and
  (f) allowing detached hulls to pass through the hulling gap and allowing the hulled nuts to pass through the separator gap,

BRIEF DESCRIPTION OF THE DRAWINGS

In the drawings, like elements are assigned like reference numerals. The drawings are not necessarily to scale, with the emphasis instead placed upon the principles of the present invention. To the extent that the drawings are of specific embodiments or a particular use of the invention, they are intended to be illustrative only, and not limiting of the claimed invention. The drawings are briefly described as follows.

FIG. 9 is a front view of the drum and the separator plate of the embodiment of the invention shown in FIG. 7.

DETAILED DESCRIPTION OF PREFERRED EMBODIMENTS

Figure 1:
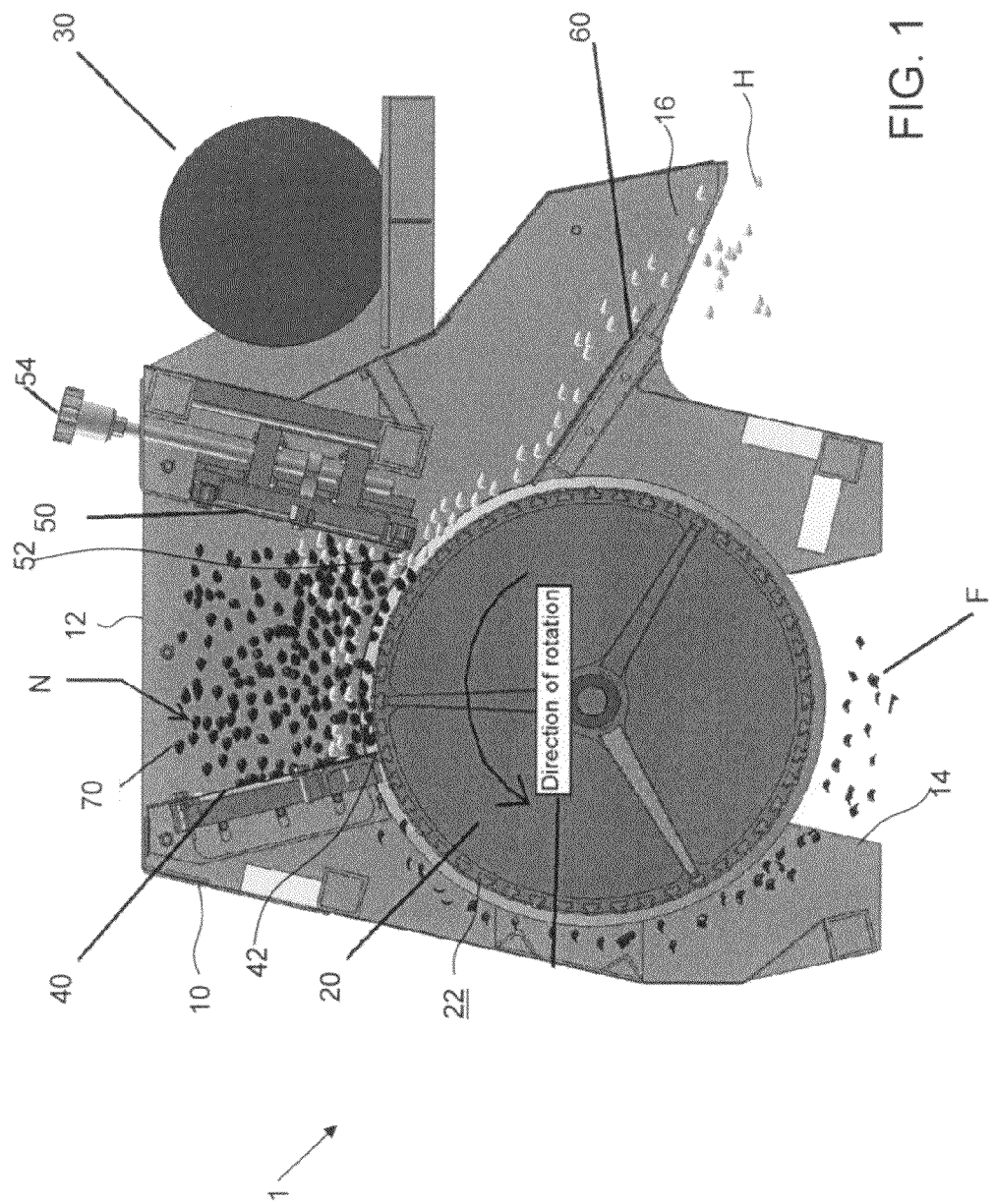
FIG. 1 is a side view of one embodiment of the apparatus of the present invention.

The present invention relates to an apparatus and a method for removing hulls from nuts. When describing the invention, any term or expression not expressly defined herein shall have its commonly accepted definition understood by those skilled in the art. To the extent that the following description is of a specific embodiment or a particular use of the invention, it is intended to be illustrative only, and not limiting of the claimed invention.

As used herein, the term "nut" shall refer to any fruit comprising a seed kernel encased within a shell and a hull, and includes without limitation pistachio nuts. As used herein, the term "shell" shall refer to the relatively hard endocarp tissue of a nut. As used herein, the term "hull" shall refer to any relatively tissue of the nut external to the shell, including without limitation any mesocarp and pericarp. As used herein, the term "hulled nut" shall refer to a nut having its seed kernel still encased within its shell, but not the hull. As used herein, the term "minimum dimension" in relation to a nut (whether unhulled or hulled) shall refer to the minimum distance between two parallel lines bounding the outline of the nut projected onto any plane. For example, the minimum dimension of a nut having a substantially ovoid shape with a major axis and a minor axis is the length of the minor axis.

In one aspect, the present invention provides an apparatus for removing hulls from nuts. Referring to the embodiment of the apparatus shown in FIG. 1, the apparatus (1) generally comprises a support frame (10), a drum (20), a means for rotating the drum (30), a hulling plate (40) with a hulling edge (42), and a separator plate (50) with a separator edge (52). The object of the apparatus is to remove and separate the hulls from nuts (N) (shown as dark shaded kernels) so as to produce hulls (F) (show as dark shaded flakes) and hulled nuts (H) (shown as light shaded kernels).

The support frame (10) may comprise any structure that is configured to support the drum (20) for rotation. In one embodiment, as shown in FIG. 1, the support frame (10) is constructed from metal stampings riveted together to form a top opening (12) for loading nuts (N), a bottom opening (14) for discharging the hulls (F), and a side opening (16) for discharging the hulled nuts (H).

Figure 2:
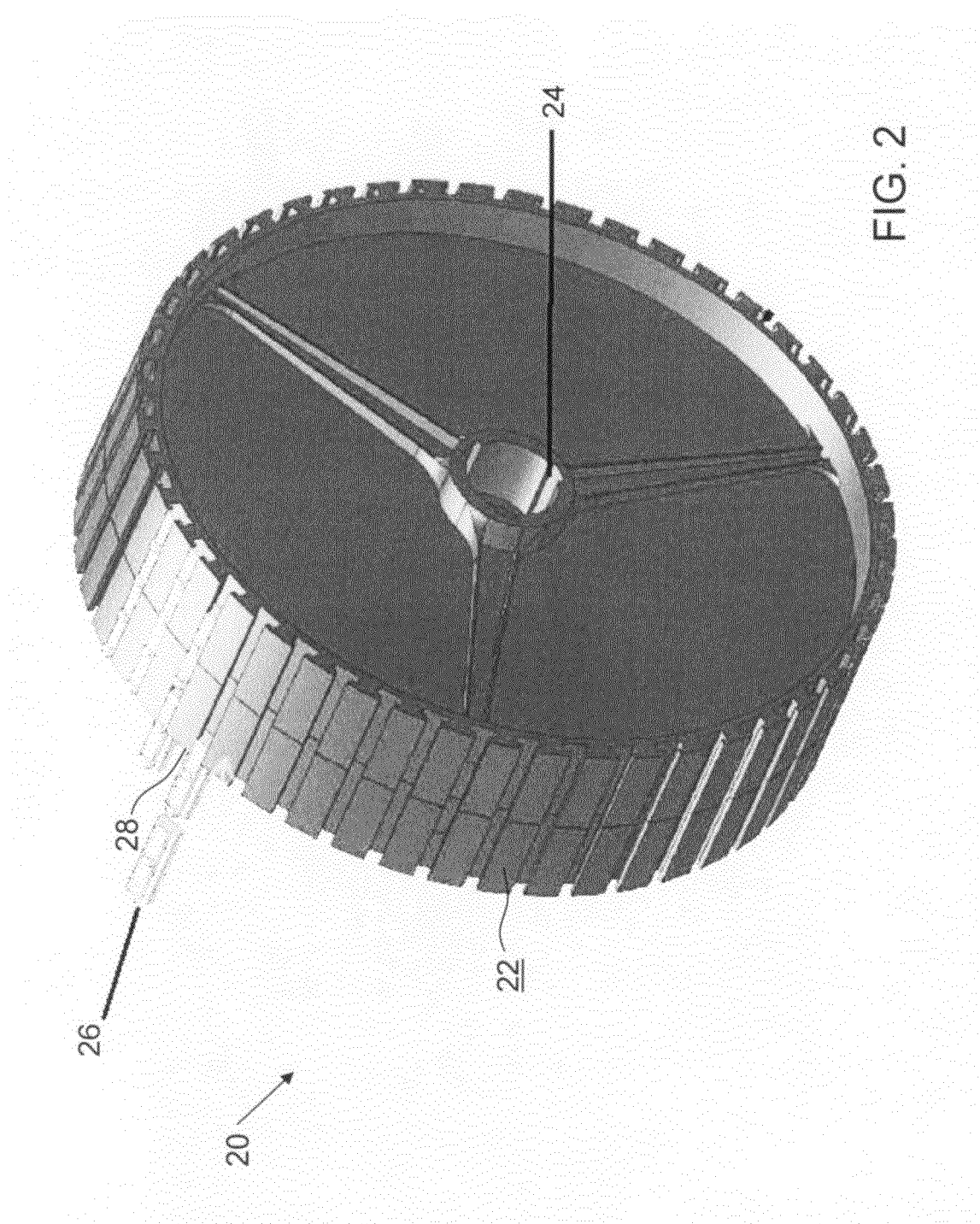
FIG. 2 is a perspective view of the drum of one embodiment of the apparatus of the present invention.

Referring to FIGS. 1 and 2, the drum (20) is substantially cylindrical in shape and disposed such that its central axis is substantially horizontal. As used herein, the term "central axis" refers to that axis which is substantially equidistant from the circumferential drum surface (22) of the drum (20). As used herein, the term "upper surface of the drum" refers to a portion of the drum surface (22) that at any given moment is disposed at or above the elevation of the central axis. The drum (20) is mounted to the support frame (10) for free rotation about the central axis.

Referring to FIGS. 2 through 6, the drum surface (22) has a plurality of spaced apart protrusions (23). The protrusions serve to impinge the nuts (N) against the hulling plate (40) as the drum (20) is rotated. The drum surface (22) and the protrusions (23) may be made of any suitably wear-resistant material such as metal.

The means for rotating the drum (30) may be implemented by any suitable means known in the art including, without limitation, an electrically powered motor and a coupling transmission.

Figure 6:
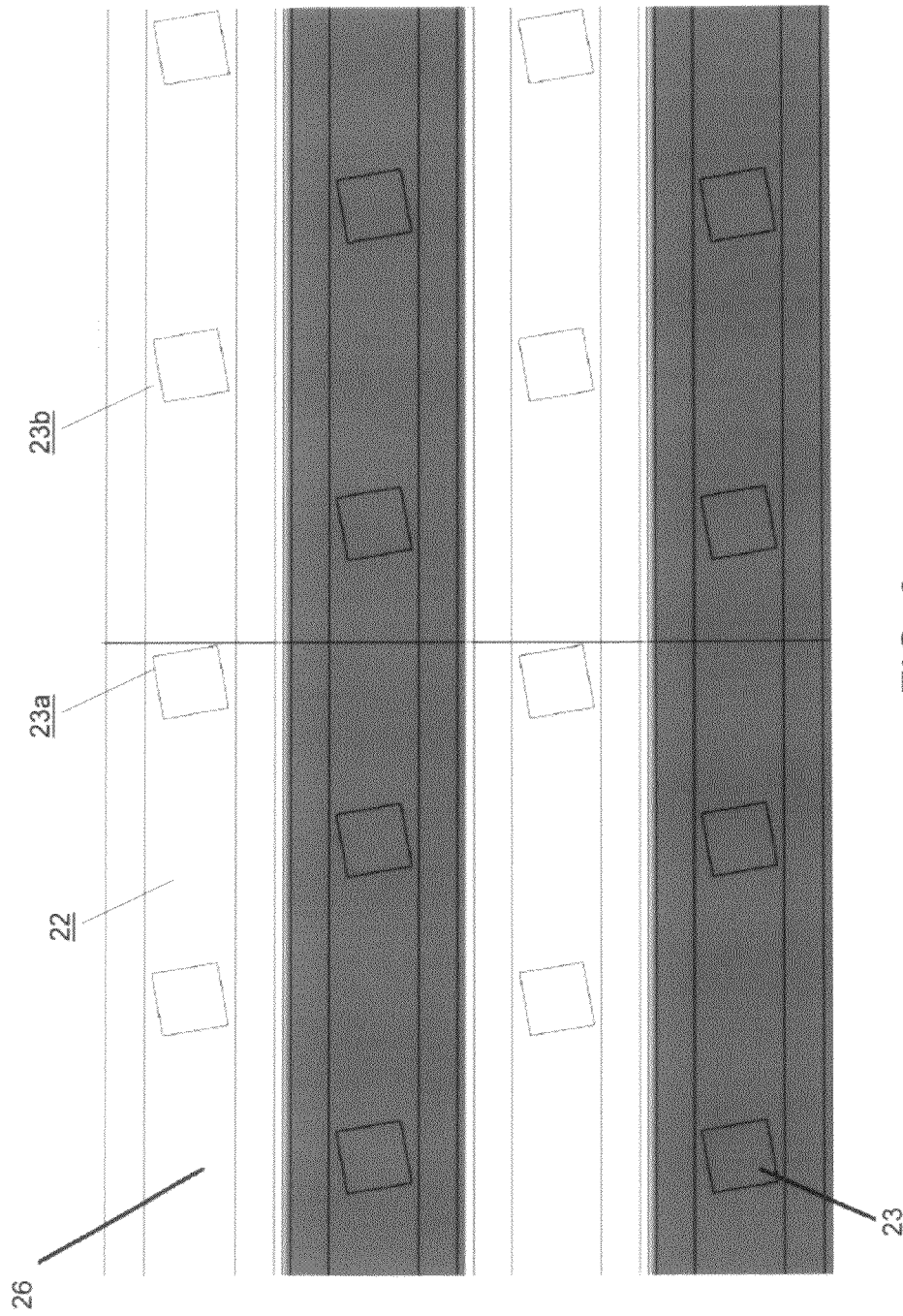
FIG. 6 is a view of a portion of the drum surface of one embodiment of the present invention.

In one embodiment, as shown in FIG. 6, the protrusions (23) are regularly spaced apart in offset rows that are parallel to the central axis of the drum (20). In one embodiment, the spacing between adjacent protrusions (23a, 23b) may be selected so that the protrusions prevent nuts (N) from passing therebetween along the drum surface (22) while permitting hulled nuts (H) to pass therebetween along the drum surface (22). For example, the distance between adjacent protrusions (23a, 23b) may greater than the minimum dimension of the hulled nuts (H) but less than the minimum dimension of the nuts (N). In this manner, the adjacent protrusions (23a, 23b) will tend to "catch" the nuts (N), while hulled nuts (H) will tend to pass between the adjacent protrusions (23a, 23b).

The configuration of the protrusions (23) may be selected to impinge the nuts (N) against the hulling plate (40) in different ways. This can affect the fineness of the resulting hulls (F) or the degree of trauma caused to the hulled nuts (N). In one embodiment, as shown in FIG. 6, the protrusions (23) have a quadrilateral cross-section parallel to the drum surface (22) with the leading face angled relative to the central axis of the drum (20). In another embodiment, not shown, the protrusions (23) may have a rounded cross-section parallel to the drum surface (23). In another embodiment, not shown, the protrusions (23) may have a knife edge that is oriented towards the hulling plate (40) as the drum (20) is rotated in the direction from the separator plate (50) to the hulling plate (40).

Figure 7:
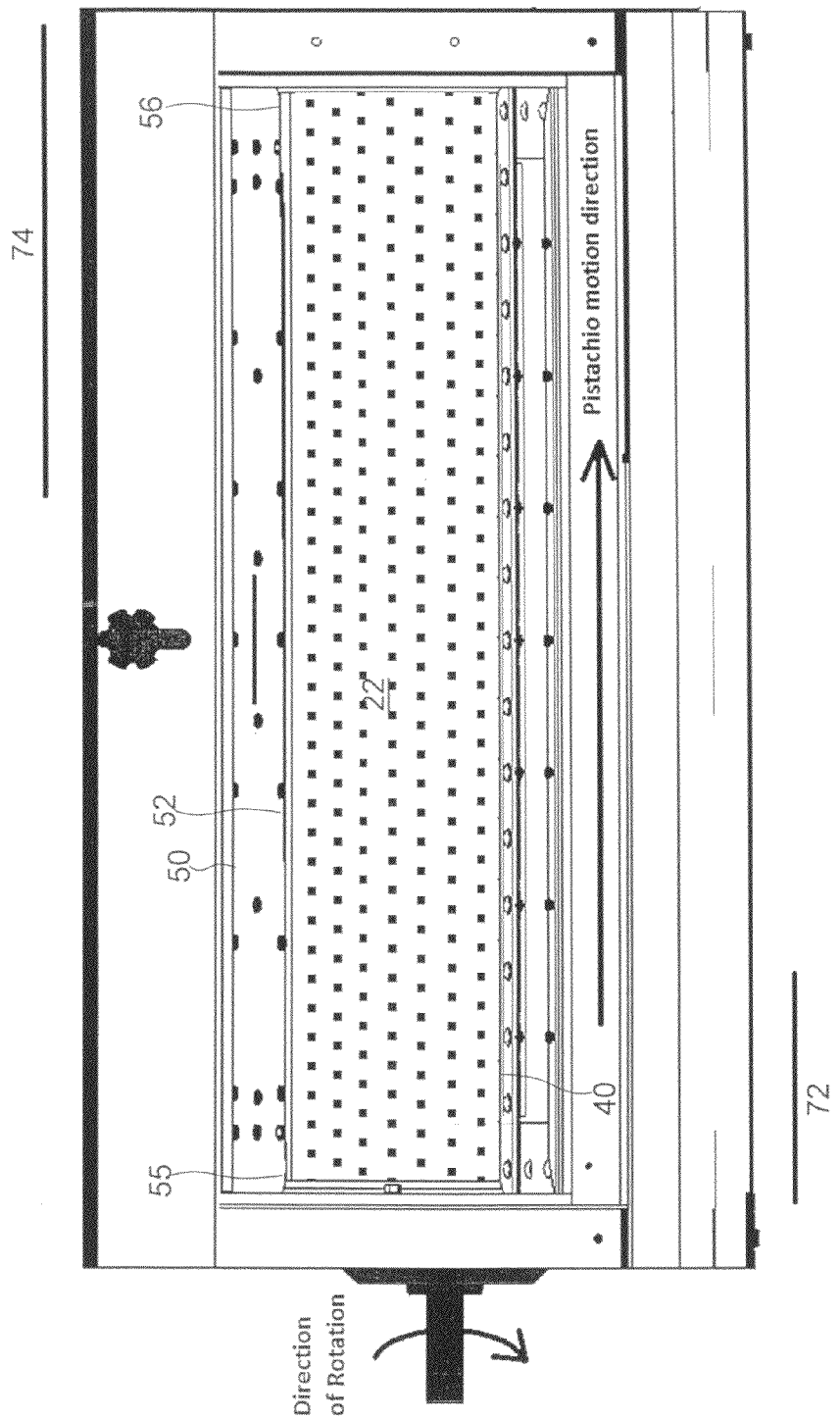
FIG. 7 is a top view of one embodiment of the apparatus of the present invention.
Figure 8:
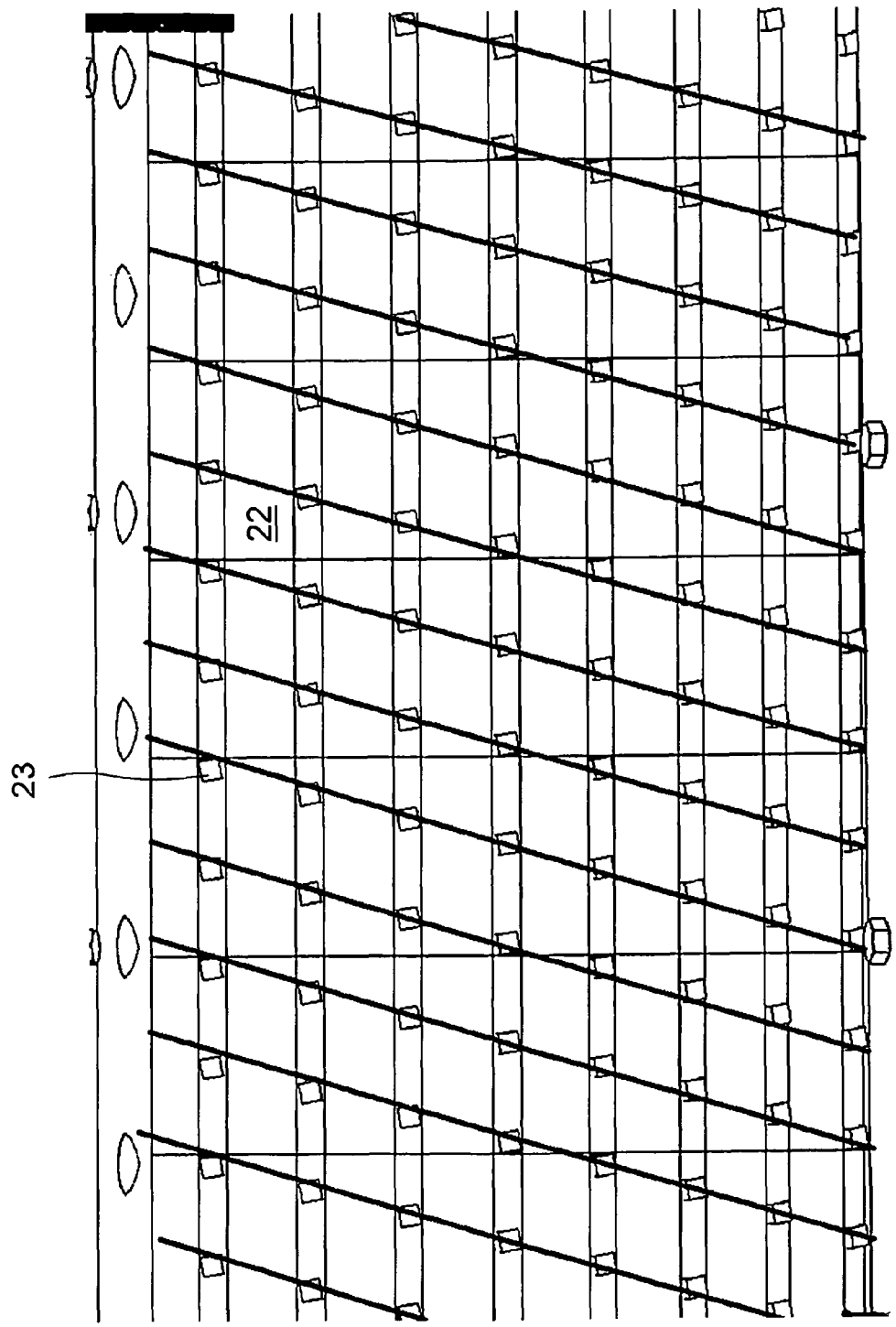
FIG. 8 is a view of a portion of the drum surface of the embodiment of the invention shown in FIG. 7.

In one embodiment, as shown in FIGS. 7 and 8, the plurality of protrusions (23) are spaced apart on the drum surface in a pattern defining a helical path running circumferentially around the central axis of the drum. When this arrangement is combined with protrusions (23) having a leading face angled relative to the central axis of the drum (20), the protrusions (23) will tend to urge the nuts (N) from one end of the drum (20) to the other end of the drum (20) as the drum (20) is rotated.

Figure 3:
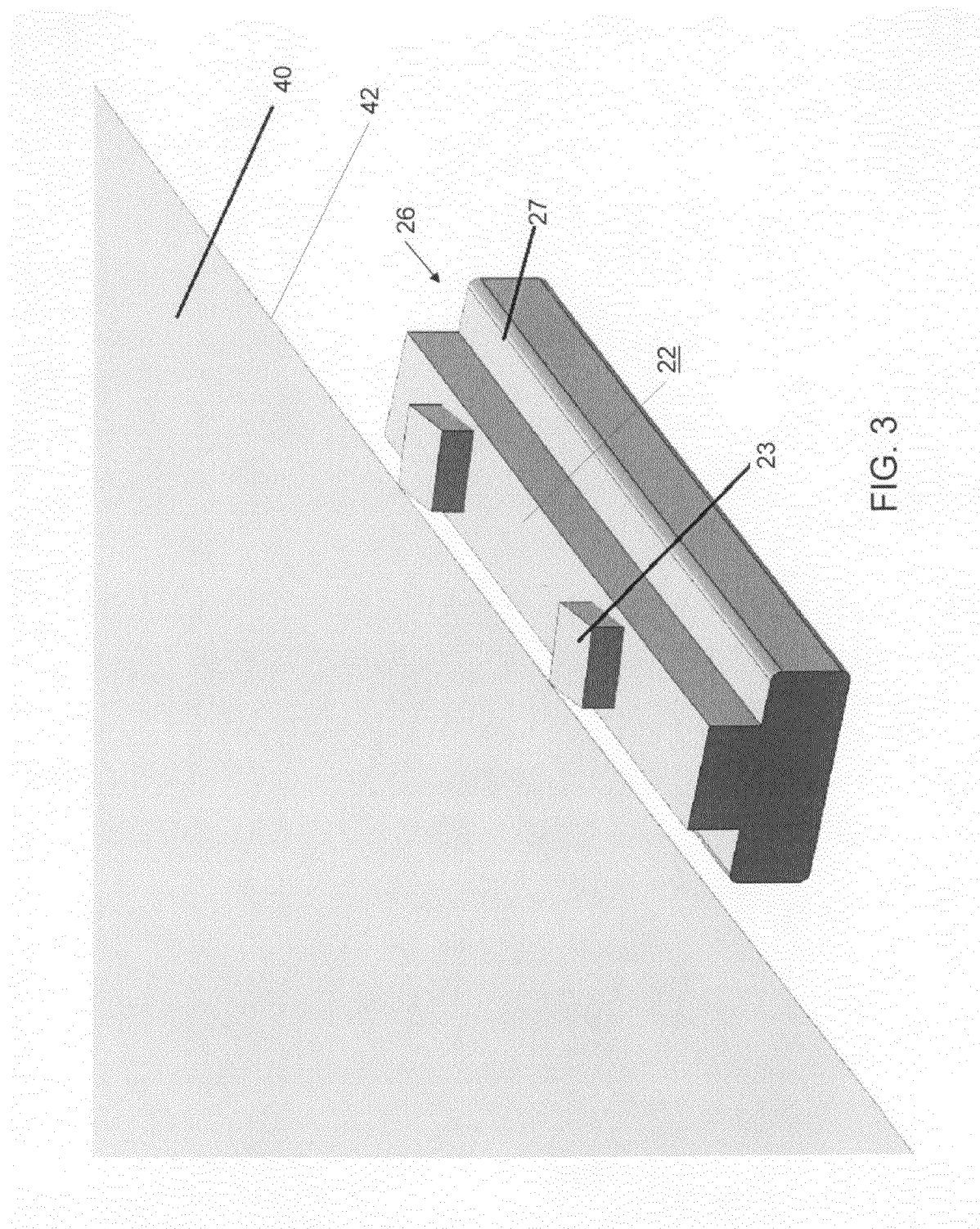
FIG. 3 is a perspective view of the hulling plate and the surface segment of one embodiment of the apparatus of the present invention.
Figure 4:
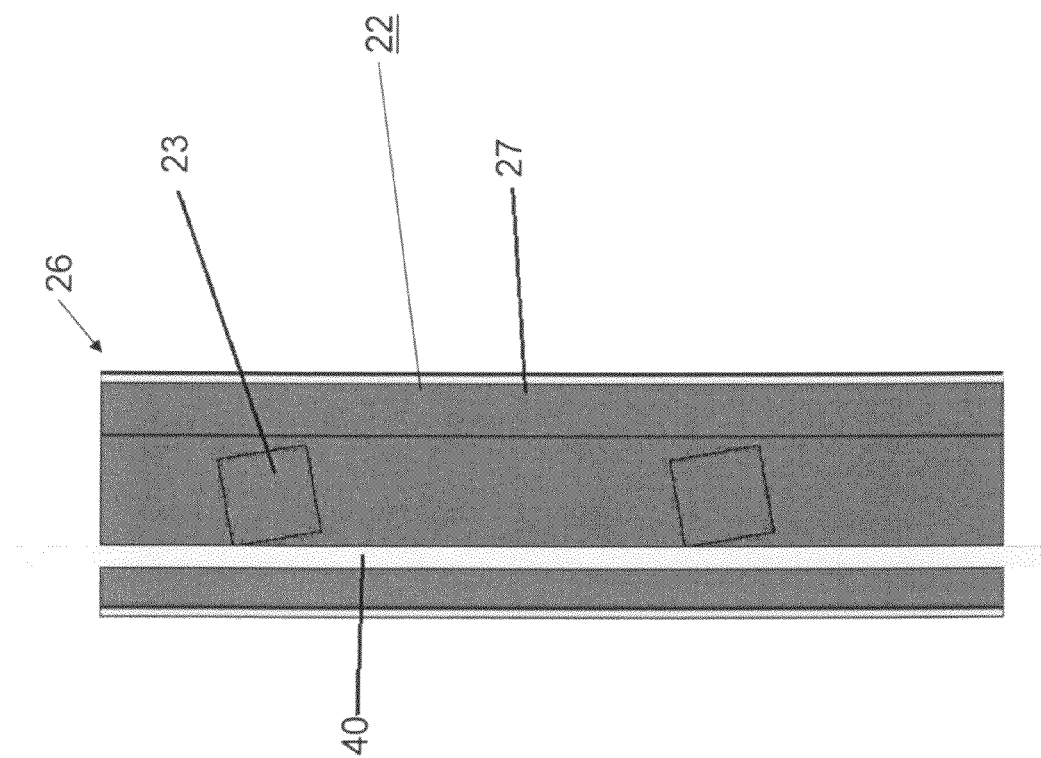
FIG. 4 is a top view of the hulling plate and the surface segment of one embodiment of the apparatus of the present invention.
Figure 5:
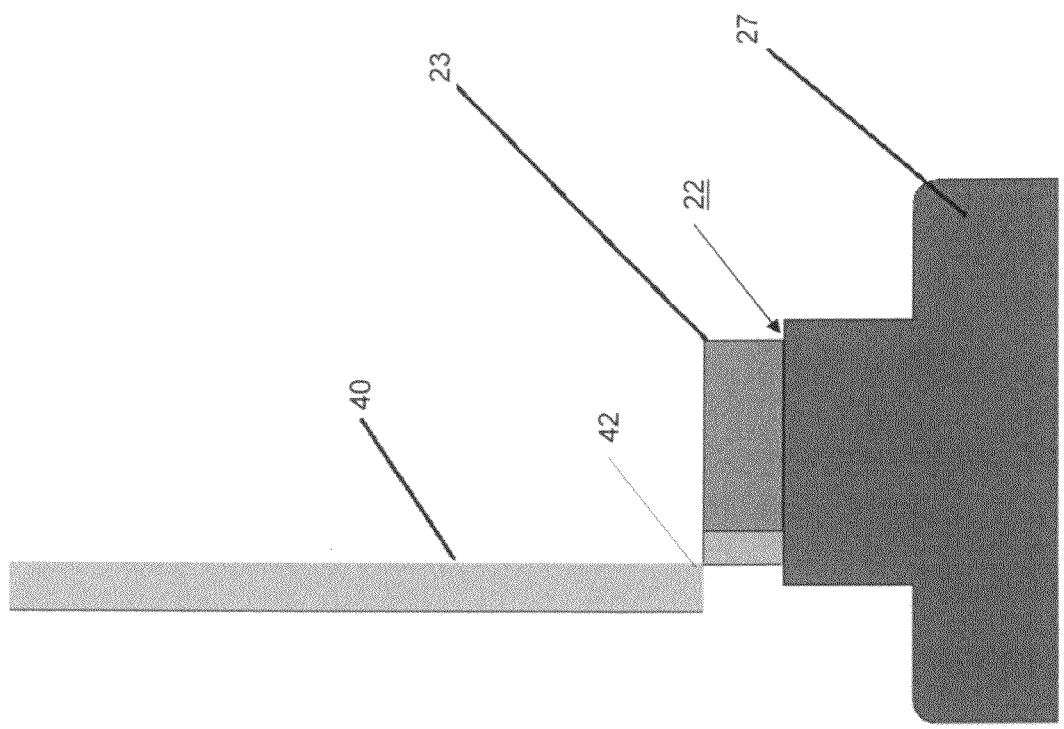
FIG. 5 is a side view of the hulling plate and the surface segment of one embodiment of the apparatus of the present invention.

In one embodiment, the drum (20) and its drum surface (22) with protrusions (23) may be formed integrally. In an alternative embodiment, as shown in FIG. 2, the drum (20) comprises a core (24) and at least one surface segment (26) removably attachable to the core (24) to define at least a portion of the drum surface (22). The surface segment (26) and the core (24) may be removably attachable by any suitable means known in the art. In one embodiment, as shown in FIGS. 2 and 3, the surface segment (26) has a tongue (27) that slides into a complementary groove (28) formed on the core (24). In one embodiment, the removably attachable surface segment (26) defines a portion of the drum surface (22) that has at least one of the plurality of protrusions (23). In this manner, if the protrusions (23) on the surface segment (26) become worn or are not suitably configured for a particular type or size of nut, then the surface segment (26) can be readily replaced by another surface segment (26) having unworn protrusions (23) or a different configuration of protrusions (23).

As shown in FIG. 1, the hulling plate (40) has a hulling edge (42). The hulling edge (42) is transverse to the drum surface (22), spanning the drum from one end to the other. As used herein, the term "transverse" means that the hulling edge (22) defines a path that has a component that is parallel to the central axis of the drum (20). In one embodiment, the hulling edge (42) may be transverse by being straight and disposed horizontally, parallel to the central axis of the drum (20). In another embodiment, the hulling edge (42) may be transverse by being curved between two points of different elevation to match the contour of the upper surface of the drum.

As shown in FIG. 3, the hulling edge (42) is disposed relative to the upper surface of the drum to define a hulling gap therebetween. The hulling gap is sufficiently large so that the hulling edge (42) does not interfere with the protrusions (23) as the drum (20) is rotated and allows hulls (F) to pass therethrough, but is sufficiently small to prevent nuts (N) and hulled nuts (H) from passing therethrough. In one embodiment, the hulling edge (42) may be a knife edge.

In one embodiment, as shown in FIG. 1, the hulling plate (40) is adjustably mounted to the support frame (10) for adjusting the distance between the hulling edge (42) and upper surface of the drum, to vary the size of the hulling gap. This may be implemented by any suitable means known in the art, including without limitation the support frame (10) and the hulling plate (40) with a plurality of mounting apertures that may be selectively aligned for receiving connecting bolts. In this manner, the hulling plate (40) may be adjusted for removing hulls from different types or sizes of nuts (N).

As shown in FIG. 1, the separator plate (50) has a separator edge (52). The separator edge (52) is transverse to the drum surface (22), spanning the drum from one end to the other. As used herein, the term "transverse" means that the separator edge (52) defines a path that has a component that is parallel to the central axis of the drum (20). In one embodiment, the separator edge (52) may be transverse by being straight and disposed horizontally, parallel to the central axis of the drum (20). In another embodiment, the separator edge (42) may be transverse by being curved between two points of different elevation to match the contour of the upper surface of the drum.

The separator edge (52) is disposed relative to the upper surface of the drum to define a separator gap therebetween. The separator gap is sufficiently large so that the separator edge (52) does not interfere with the protrusions (23) as the drum (20) is rotated. At least a portion of the separator gap is sufficiently large to permit hulled nuts (H) to pass therethrough. In one embodiment, the separator gap may be sufficiently small to prevent nuts (N) from passing therethrough.

In one embodiment, the entire separator gap is sized to permit passage of hulled nuts. In another embodiment, only a portion of the separator gap is sized to permit passage of hulled nuts (H). Any region of the separator edge (52) may define the portion of the separator gap that is sized to permit passage of hulled nuts (H). In one embodiment, as shown in FIG. 9, the separator edge (52) is inclined so that the distance between the separator edge (52) and the upper drum surface increases from one end (55) to the other end (56) of the separator edge (52), and the portion of the separator gap that is sized to permit passage of the hulled nuts (H) is limited to that region of the separator edge (52) including the end (56).

In one embodiment, as shown in FIG. 1, the separator plate (50) is adjustably mounted to the support frame (10) for adjusting the distance between the separator edge (52) and the upper surface of the drum, to vary the size of the separator gap. This may be implemented by any suitable means known in the art including, as shown in FIG. 1, a screw-adjustable pin (54) which may be selectively screwed to vary the distance between the separator edge (52) and the upper surface of the drum. In this manner, the separator plate (50) may be adjusted for different applications such as removing hulls from different types or sizes of nuts (N).

As shown in FIG. 1, the upper surface of the drum, the hulling plate (40) and the separator plate (50) define a hulling chamber (70). The hulling edge (42) is spaced apart from the separator edge (52) along the upper surface of the drum. It will be understood from the positions of the hulling edge (42) and the separator edge (42), and from the sizing of the hulling gap and the separator gap, as described above, that any nuts (N) in the hulling chamber (70) will be retained within the hulling chamber (70), while hulled nuts (H) may pass out of the hulling chamber (70) by passing through at least a portion of the separator gap. In one embodiment, the hulling edge (42) is disposed above the separator edge (52). In a further embodiment, the hulling edge (42) and the separator edge (52) are disposed on the same horizontal side of the central axis. In the latter configuration, the portion of the upper surface of the drum between the hulling edge (42) and the separator edge (52) will descend monotonically from the hulling edge (42) to the separator edge (52). In this manner, any hulled nuts (H) on this portion of the upper surface of the drum will tend to slide downwards towards the separator edge (52).

The drum (20) is rotatable about the central axis so that the upper surface of the drum in the hulling chamber (70) rotates towards the hulling plate (40) and away from the separator plate (50). That is, a point on the drum surface (22) that at any given moment is on the part of upper surface of the drum defining the hulling chamber (70) moves closer to the hulling plate (40) and further away from the separator plate (50) as the drum (20) rotates about the central axis.

In one embodiment, the apparatus (1) may be provided with means for loading nuts into the hulling chamber (70), such as but not limited to a hopper or bucket elevator disposed above the hulling chamber (70). In one embodiment, the apparatus (1) may be provided with means for collecting the hulls (F), such as but not limited to a container disposed below the bottom opening (14). In one embodiment, the apparatus (1) may be provided with means for collecting hulled nuts (H) such as but not limited to, as shown in FIG. 1, a slide (60) leading to the side opening (16).

The use and operation of the apparatus (1) as shown in FIG. 1 for removing hulls from nuts (N) is now described. The object of the method is to produce hull (F) separated from hulled nuts (H). It will be understood that the nuts (N) and the hulled nuts (H) should have a reasonably uniform range of minimum dimensions. To set up the apparatus (1), the configuration and the spacing of the protrusions (23) are selected, and the hulling plate (40) is adjusted to set the hulling gap, and the separator plate (50) is adjusted to set the separator gap to have the desired effect, as described above.

Once the apparatus (1) has been set up, nuts (N) are deposited in the hulling chamber (70). In the embodiment of the apparatus (1), as shown in FIGS. 7 to 9, the nuts (N) are preferably deposited in an input zone (72) of the hulling chamber (70) situated near the hulling plate (40) and nearest the end (55) of the separator edge (52).

The motor (30) is activated to rotate the upper surface of the drum within the hulling chamber (70) towards the hulling plate (40) and away from the separator plate (50). As the drum (20) rotates, the protrusions (23) push the nuts (N) towards the hulling plate (40). When the nuts (N) reach the hulling plate (40) they are impinged by the moving protrusions (23) against the hulling edge (42). The spacing and configuration of the protrusions (23) and the rotational speed of the drum (20) are selected so that this impingement, and in particular the vertical edges of the protrusions (23), will traumatize the relatively soft hulls through slicing, tearing, crushing action or a complex combination thereof, without causing undesirable trauma to relatively hard shell. As a result of this action, the protrusions (23) will remove the hulls from the nuts and push the hulls (F) through the hulling gap between the drum surface (22) and the hulling edge (42), and onwards towards the bottom opening (14). Any relatively soft foreign materials intermixed with the nuts (N) such as leaves, small branches, and garbage will be processed in a similar manner as the hulls (F). It may be necessary for a particular unhulled nut (N) to be impinged multiple times before its hull (F) is completely removed, depending on the resilience the hull, the adherence of the hull to the nut (N), the rotational speed of the drum (20) and the configuration of the protrusions (23).

The hulled nuts (H) cannot pass through the hulling gap. Accordingly, as the drum (20) continues to rotate and the protrusions (23) push more nuts (N) towards the hulling plate (40), the hulled nuts (H), which still have their relatively hard shells, will tend to migrate or "bounce" back towards the separator plate (50). Upon reaching the separator plate (50), the hulled nuts (H) will pass through the separator gap. This process may be assisted by configuring and spacing the protrusions (23) to "catch" the nuts (N) in preference to hulled nuts (H), as described above, and by disposing the separator edge (52) below the hulling edge (42) so that gravity will cause the hulled nuts to fall towards the separator edge (52).

In the embodiment of the apparatus (1) shown in FIGS. 7 through 9, the orientation of the leading edges of the protrusions (23) and the arrangement of the protrusions (23) on the drum surface (22) tend to advance the nuts (N) and hulled nuts (H) from the input zone (72) of the hulling chamber (70) towards the output zone (74) of the hulling chamber (70). As the nuts (N) move in the direction from the input zone (72) towards the output zone (74), the nuts (N) and hulled nuts (N) are impinged against the hulling plate (40) in the hulling zone (73) along the length of the drum (20). The hulled nuts (H) are only discharged from the hulling chamber (70) upon reaching the output zone (74) situated near the end (56) of the separator edge (52) where the separator gap is sufficiently large to permit the hulled nuts (H) to pass therethrough. It will be appreciated that this embodiment of the apparatus (1) allows the discharge of the hulled nuts (H) to be limited to one end of the apparatus (1), and may be used to better ensure that the hulled nuts (H) are completely dehulled by promoting repeated impingement of the nuts (N) against the hulling plate (40) in the hulling zone (73) before the hulled nuts (H) are permitted to pass through the separator gap at the output zone (74).

The apparatus (1) as described above may also be used as a slicer to process a product into smaller product fragments (F). In this application, the apparatus (1) is set up by adjusting the separator plate (50) so that the separator gap is sufficiently small to prevent the passage of the product. The use and operation of the apparatus (1) is the same as described above except that, because the product cannot pass through either the hulling gap or the separator gap, the product will be continuously cut by the advancing protrusions (23).

As will be apparent to those skilled in the art, various modifications, adaptations and variations of the foregoing specific disclosure can be made without departing from the scope of the invention as defined by the claims herein.

What is claimed is:

1. An apparatus for removing hulls from nuts comprising:
   (a) a support frame;
   (b) a substantially cylindrical drum having a substantially horizontal central axis and a circumferential drum surface with a plurality of spaced apart protrusions; wherein the drum is rotatably mounted to the support frame for rotating about the central axis;
   (c) a means for rotating the drum;
   (d) a hulling plate having a hulling edge transverse to the drum surface; wherein the hulling edge and an upper surface of the drum define therebetween a hulling gap that is sized to permit passage of the protrusions and hulls, but not nuts;

(e) a separator plate having a separator edge transverse to the drum surface; wherein the separator edge and the upper surface of the drum define therebetween a separator gap that is sized to permit passage of the protrusions and wherein at least a portion of the separator gap is sized to permit passage of hulled nuts; and wherein the upper surface of the drum, the hulling plate and the separator plate define a hulling chamber where the drum surface rotates towards the hulling plate and away from the separator plate.

2. The apparatus of claim 1 wherein the plurality of protrusions are spaced apart to prevent passage of nuts along the drum surface between the protrusions but permit passage along the drum surface of hulled nuts between the protrusions.

3. The apparatus of claim 1 wherein at least one of the plurality of protrusions comprises a knife edge oriented towards the hulling plate as the drum surface in the hulling chamber rotates toward the hulling plate and away from the separator plate.

4. The apparatus of claim 1 wherein at least one of the plurality of protrusions has a quadrilateral cross-section parallel to the drum surface.

5. The apparatus of claim 4 wherein the quadrilateral cross-section has a leading face that is angled relative to the central axis of the drum.

6. The apparatus of claim 1 wherein the plurality of protrusions are spaced apart on the drum surface in a pattern defining a helical path running circumferentially around the central axis of the drum.

7. The apparatus of claim 1 wherein the drum comprises a core and at least one surface segment removably attachable to the core to define at least a portion of the drum surface.

8. The apparatus of claim 7 wherein the at least one surface segment is removably attachable to the core via a complementary tongue and groove connection formed on the surface segment and the core, respectively, or vice versa.

9. The apparatus of claim 7 wherein the at least one surface segment defines a portion of the drum surface having at least one of the plurality of protrusions.

10. The apparatus of claim 9 wherein the hulling edge is disposed above the separator edge.

11. The apparatus of claim 9 wherein the hulling edge and the separator edge are disposed on the same horizontal side of the central axis of the drum.

12. The apparatus of claim 1 wherein the hulling edge is a knife edge.

13. The apparatus of claim 1 where the entire separator gap is sized to permit passage of hulled nuts.

14. The apparatus of claim 1 wherein only a portion of the separator gap is sized to permit passage of hulled nuts.

15. The apparatus of claim 14 wherein the portion of the separator gap that is sized to permit passage of hulled nuts is defined by a region of the separator edge including an end of the separator edge.

16. The apparatus of claim 1 wherein the hulling plate is adjustably mounted to the support frame for adjusting the size of the hulling gap.

17. The apparatus of claim 1 wherein the separator plate is adjustably mounted to the support frame for adjusting the size of the separator gap.

* * * * *